United States Patent [19]
Frantz et al.

[11] 4,336,042
[45] Jun. 22, 1982

[54] CANISTER-COMPACTOR ASSEMBLY

[75] Inventors: Virgil L. Frantz; Lanier Frantz, both of Salem, Va.

[73] Assignee: Graham-White Sales Corporation, Salem, Va.

[21] Appl. No.: 196,547

[22] Filed: Oct. 14, 1980

[51] Int. Cl.³ .......................................... B01D 53/26
[52] U.S. Cl. ..................................... 55/387; 55/475; 55/DIG. 17
[58] Field of Search .......... 55/33, 62, 74, 75, 161–163, 55/179, 208, 267, 316, 387, 389, 475, DIG. 17

[56] References Cited
U.S. PATENT DOCUMENTS

| | | | |
|---|---|---|---|
| 2,586,670 | 2/1952 | Lambertsen | 55/475 X |
| 3,001,605 | 9/1961 | Hill | 55/316 |
| 3,186,150 | 6/1965 | Zankey | 55/475 X |
| 3,374,052 | 3/1968 | Fan et al. | 55/475 X |
| 3,464,186 | 9/1969 | Hankison et al. | 55/316 X |
| 3,838,977 | 10/1974 | Warren | 55/475 X |
| 4,029,486 | 6/1977 | Frantz | 55/316 X |
| 4,097,248 | 6/1978 | Frantz | 55/33 |
| 4,113,451 | 9/1978 | Frantz | 55/163 X |
| 4,131,442 | 12/1978 | Frantz | 55/316 X |
| 4,261,715 | 4/1981 | Frantz | 55/316 X |

*Primary Examiner*—Robert H. Spitzer
*Attorney, Agent, or Firm*—Wilmer Mechlin

[57] ABSTRACT

A canister-compactor assembly insertible as a unit in a housing of a compressed gas filter, the assembly including a canister loadable with a particulate desiccant and a pneumatic compactor mounted in an outlet end of the canister and chargeable with compressed gas for compacting the desiccant, the compactor being chargeable and dischargeable outside the filter housing and in the housing being exposed to filtered compressed gas for maintaining the desiccant compacted.

10 Claims, 6 Drawing Figures

CANISTER-COMPACTOR ASSEMBLY

BACKGROUND OF THE INVENTION

While molecular sieves in bead form are widely used in compressed gas filters for their unique capability of selectively adsorbing a contaminant, such as moisture, from a compressed gas passed therethrough, it has been recognized that the mutual abrasion of the beads produces dust, which, picked up by the gas, can detrimentally affect air brakes or other gas-operated devices when the product gas is so employed. As in Hankison et al. U.S. Pat. No. 3,464,186 and Frantz U.S. Pat. No. 4,097,248, the dust-producing interabrasion of the desiccant particles was somewhat mitigated against by resort to a compressed coil spring for compacting the particles. However, whether the spring was contained in the canister containing the particulate desiccant or mounted in the housing of the filter unit into which the desiccant canister was inserted, the shortcoming of the coil spring was that, since the force exertable by such a spring progressively decreases as the spring expands, it could not adequately compensate for settlement of the particles. A practical solution for the problem posed by the progressive settlement of the particles is disclosed in L. Frantz U.S. Pat. No. 4,029,486 in which a compacting spring is replaced by a pneumatic compactor mounted in the housing of the filter unit and having a piston actuated by compressed gas with which the compactor is automatically chargeable during the filter unit's filter cycle and acting through a floating follower in a canister loaded with a particulate desiccant for maintaining a constant compacting force on the desiccant regardless of settlement of the latter. While manually dischargeable to permit removal of an exhausted desiccant canister and insertion of a newly loaded replacement in the housing of a filter unit, a compactor of the L. Frantz patent could not compact the particulate desiccant prior to insertion of the canister in the housing and had to be discharged whenever a canister was inserted into or removed from the filter unit housing. It is to an improvement on the compactor of the L. Frantz patent possessing these capabilities that the present invention is particularly directed.

SUMMARY OF THE INVENTION

The primary object of the present invention is to provide an improved canister-compactor assembly insertible as a unit in a housing of a compressed gas filter unit and having a canister loadable with a particulate desiccant and a pneumatic compactor in an outlet end of the canister, whereof the compactor is prechargeable and dischargeable when the assembly is outside the housing and within the housing is exposed to filtered compressed gas during the filter unit's filter cycle for automatically maintaining its charge and thereby the compacting force it applies to the desiccant.

Another object of the invention is to provide a canister-compactor assembly of the character described in the preceding object in which the pneumatic compactor is mounted in and acts internally of the canister in applying by a differential piston actuated by compressed gas and acting through a floating follower a substantially constant compacting force on the particulate desiccant loaded in the canister regardless of settlement of the desiccant within the piston's range of movement.

A further object of the invention is to provide a canister-compactor assembly insertible as a self-contained unit in a housing of a compressed gas filter unit, wherein a pneumatic compactor incorporated in an outlet end of a canister loadable with a particulate desiccant applies a compacting force to the desiccant by a gas-actuated differential piston and is fitted with charging and vent check valves and through the charging valve is chargeable with compressed gas both outside and inside the housing and dischargeable outside the housing, the latter incident to reloading of the canister with the desiccant.

Other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
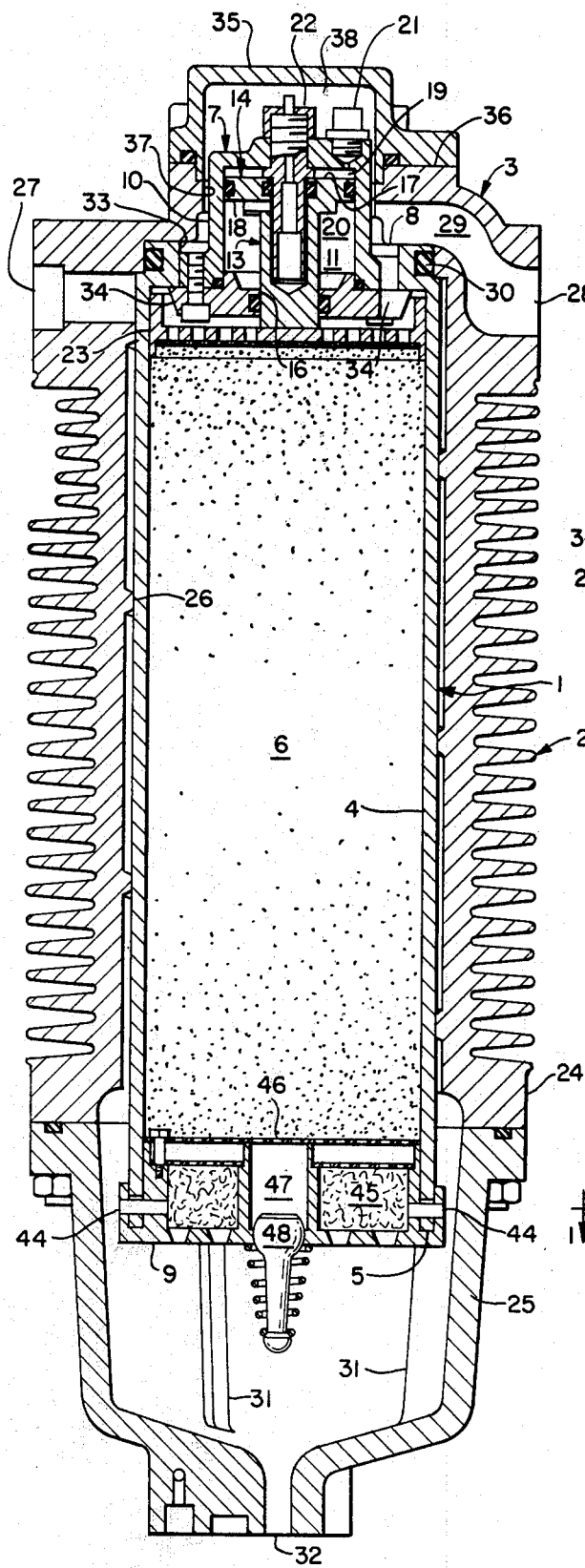
FIG. 1 is a vertical sectional view, in part on the staggered section lines 1—1 of FIG. 3, of a housing of a compressed gas filter unit containing an embodiment of the canister-compactor assembly of the present invention.

Referring now in detail to the drawings in which like reference characters designate like parts, the improved canister-compactor assembly of the present invention is designed for use in a housing of a compressed air or other gas filter unit for separating or otherwise removing one or more solid, liquid or gaseous contaminants suspended or entrained in the compressed gas. The filter unit in this case is of the desiccant type in which a contaminant such as moisture is adsorbed by a molecular sieve or other particulate desiccant and which, when the adsorbed or separated contaminant is moisture, usually is known in the trade as a "dryer" or "dryer unit."

Particulate desiccants, including molecular sieves in small particle or bead form, preferred for their unique selective adsorption over a wide temperature range, tend by the abrading action of the particles on each other to produce dust, which, when picked up or entrained by compressed gas passing through the desiccant, can detrimentally affect air brakes or other devices operated by the compressed gas. The canister-compactor assembly of the present invention, designated as 1, not only minimizes the dust-producing tendency of a particulate desiccant and automatically compensates for settlement of the desiccant but, as a self-contained unit insertible as such into a housing 2 of a compressed gas filter unit 3, is adapted to subject or apply to a particulate desiccant with which the assembly is loaded or charged a substantially constant compacting force, both before and while the assembly is inserted in the filter unit's housing.

Figure 2:
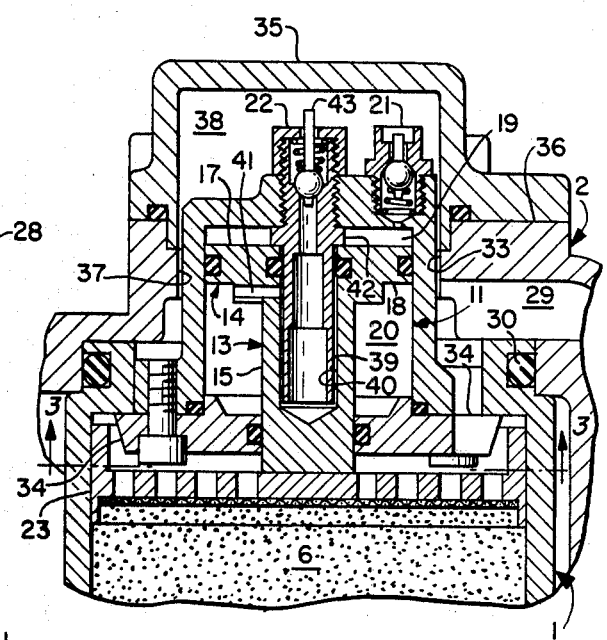
FIG. 2 is a fragmentary vertical sectional view on an enlarged scale showing the compactor of the assembly of FIG. 1.
Figure 3:
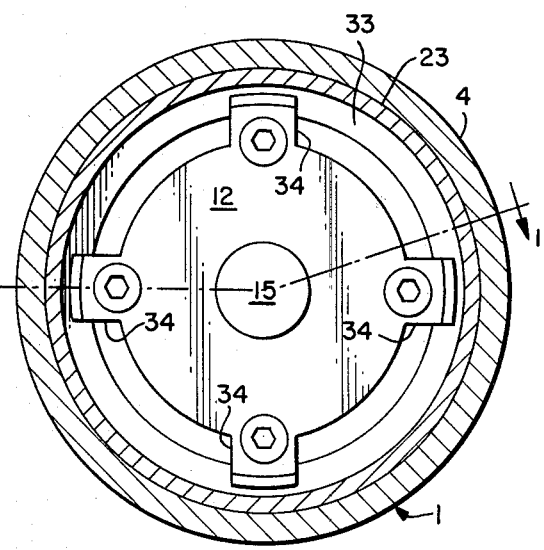
FIG. 3 is a fragmentary horizontal sectional view taken along lines 3—3 of FIG. 2.
Figure 4:
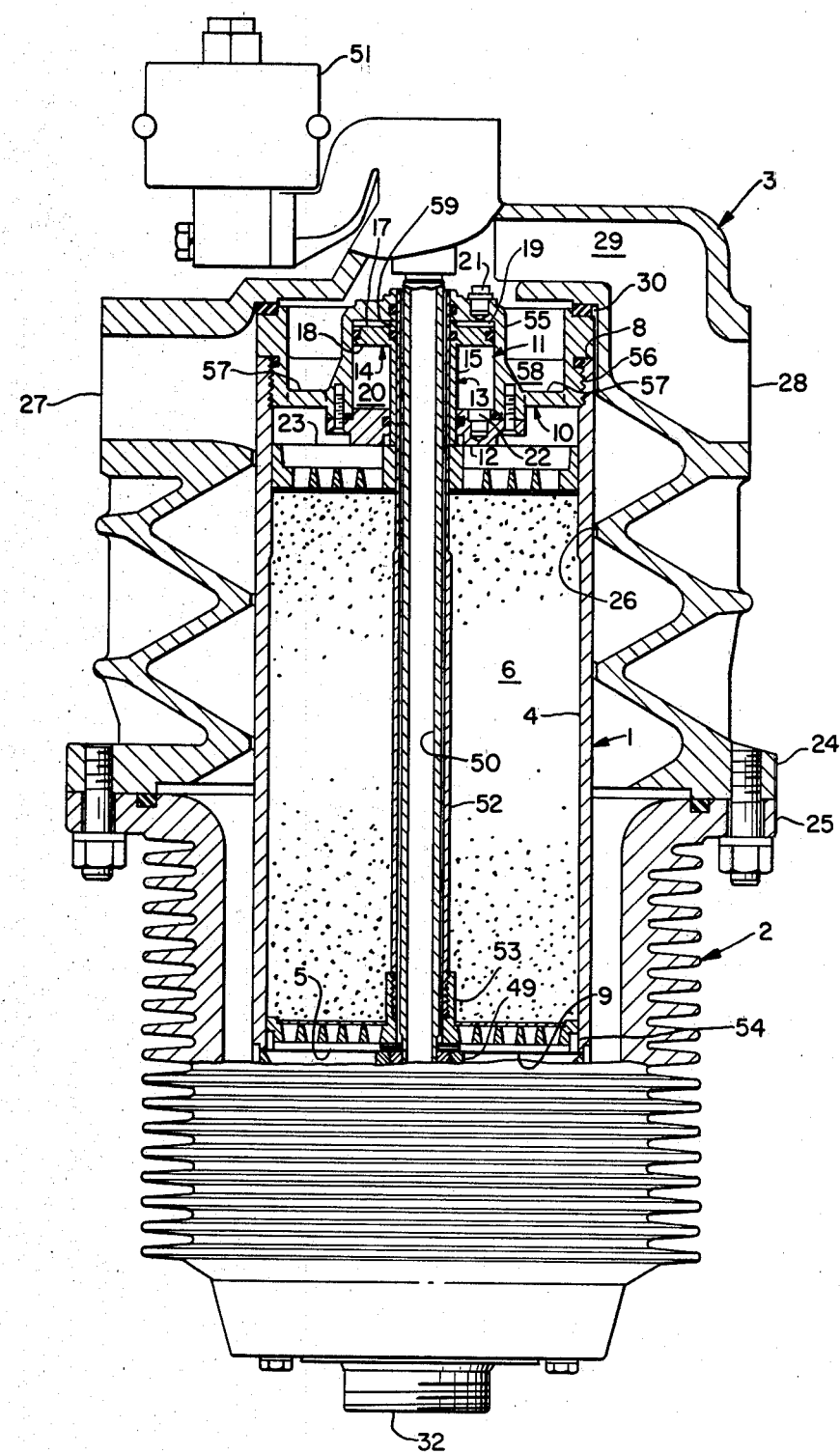
FIG. 4 is a side elevational view with portions broken away and shown in section of a different filter unit housing containing a second embodiment of the canister-compactor assembly of the present invention.
Figure 5:
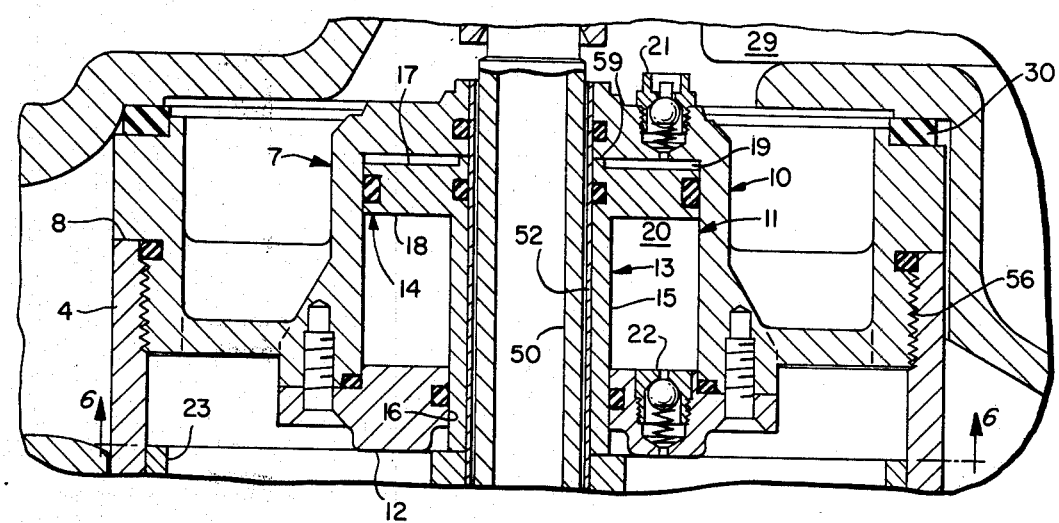
FIG. 5 is an enlarged fragmentary view on the vertical section of the sectional part of FIG. 4, showing more clearly details of construction of the compactor and its mounting in the canister.
Figure 6:
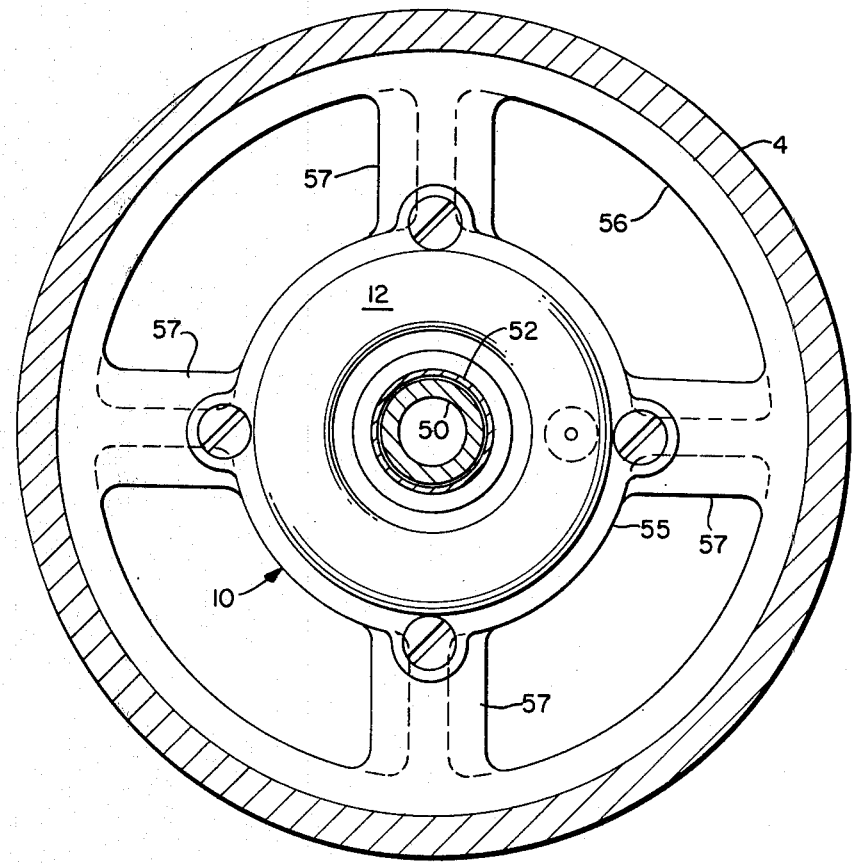
FIG. 6 is a fragmentary horizontal sectional view taken along lines 6—6 of FIG. 5.

As exemplary of the invention, two embodiments of the canister-compactor assembly are illustrated in the accompanying drawings, a first in FIGS. 1–3 and a second in FIGS. 4–6. In both, the assembly is comprised of a canister or cartridge 4 loadable or fillable through its bottom or inlet end 5 in the first embodiment and through its top in the second, with a preferably molecular sieve small bead particulate desiccant 6, and a pneumatic compactor 7 mounted or seated, suitably removably or releasably, in the canister's top or outlet end 8. In both embodiments as well, the canister 4, after being loaded or charged with the particulate desiccant 6, contains the desiccant column or bed at the bottom by a perforate or foraminous closure member 9 preferably inserted into and releasably locked in the canister's inlet end.

Alike in the foregoing respects, the two illustrated embodiments also are similar in their pneumatic compactors 7, each compactor including a casing or housing 10 containing a downwardly opening valve compartment or chamber 11 closed at the bottom by a bottom cap or cover 12, and a vertically or axially shiftable or movable differential piston 13 having a head 14 contained and riding or sliding in the compartment 11 in sealing engagement with the side wall thereof and a stem or plunger 15 of relatively reduced cross-section concentric and integral or rigid with the head and depending or projecting downwardly therefrom through a marginally-sealed opening 16 in the bottom cap. With a larger surface area presented or exposed by its upper side or surface 17 than its under or lower side or surface 18, the head 14 divides the value compartment 11 axially or vertically into upper and lower parts 19 and 20 respectively, of which the upper part serves as a pressure chamber into which compressed gas is introduced through a charging check valve 21 in the top wall of the casing for actuating the piston 13 downwardly or in a downward direction and correspondingly increasing the downward projection of the plunger 15 from or below the bottom cap 12. In addition to the charging check valve 21, the pneumatic compactor 7 of each embodiment is fitted with a vent check valve 22 communicating with or fluid-connected to the lower part 20 of the compartment 11 below the head 14 for venting therefrom any compressed gas therein that otherwise would interfere with or cushion downward movement of the piston under force of the actuating compressed gas introduced into the pressure chamber 19. Actuated as needed for applying a substantially constant compacting force on the desiccant 6 by compressed gas introduced through the charging valve, the differential piston 13 applies that force by its plunger 15 to a floating follower 23 contained in the canister 4 below the plunger and bounding or containing the upper or outlet end of the bed or column of the desiccant.

The illustrated embodiments are also generally similar in their housings 2 and the seatings of the canister-compactor assemblies 1 therein. Thus, each of the housings 2 is externally finned and divided vertically into an upper part 24 and a lower part 25, the latter releasably attached or connected, as by bolting, to the upper part for access to the housing's interior. In each case, the canister-compactor assembly 1 is insertible into and removable from the housing 2 by detaching the housing's lower part 25 and suitably is seated or received in a central bore 26 of the upper part 24 between the housing's inlet and outlet ports 27 and 28, respectively. When inserted or installed, the canister 4 is so seated in the bore 26 and gasketed, as at 30, at the top as to block direct communication between the inlet and outlet ports 27 and 28 and force dirty compressed air entering the inlet port in a filtering cycle of the filter unit 3 to flow downwardly between confronting walls of the canister and housing and then upwardly through the canister for discharge as filtered compressed gas into an outlet passage 29 in the upper part of the housing leading to the outlet port. Also in each embodiment the charging check valve 21 and conveniently also the vent check valve 22 are respectively openable by and openable for venting into the filtered compressed air discharged from the bed or column of desiccant 6.

Provided with instanding ribs or other suitable supports 31 in its lower part 25 for supporting and releasably holding the canister-compactor assembly 1 in seated position, the housing 2 of the filter unit 3 of each embodiment has, in addition to the inlet and outlet ports 27 and 28, a drain port 32. As in L. Frantz U.S. Pat. No. 4,029,486, each of the ports is suitably valved by a valve (not shown) and the filter unit is adapted to alternate between filtering and regenerating or draining cycles either in response to pumping and idling cycles of a compressor supplying the unfiltered compressed gas or if, as in Frantz U.S. Pat. No. 4,113,451, the unfiltered compressed gas is supplied from a reservoir, preferably under control of timer-controlled solenoid-actuated valving. In either case, in the filtering cycle the drain port 32 is closed and the inlet and outlet ports are open for passing and filtering the dirty or unfiltered compressed gas. Conversely, in the regenerating cycle, the inlet and outlet ports 27 and 28 are closed and the drain port 32 open, the latter for draining matter separated from the compressed gas and accumulated in the bottom of the housing 2 and also venting previously filtered regenerating gas suitably supplied to the housing for regenerating the desiccant 6 by back or reverse flow therethrough toward or in the direction of the drain port.

As to differences, in the first embodiment illustrated in FIGS. 1–3, the canister 4 of the canister-compactor assembly 1 has at or bounding its outlet end 8 an inturned or instanding integral annular flange 33. Installed ahead of the floating follower 23 and desiccant 6 into the then empty canister 4, by being dropped or inserted into the canister through the latter's inlet end 5, the pneumatic compactor 7, when installed, seats or is positioned in the canister's outlet end 8 with its casing 10 projecting therethrough and is held in that position against outward movement relative to the canister, by engagement with the underside of the inturned flange 33, of a spider 34 outstanding laterally from the bottom cap 12 and formed by a plurality and preferably four radially outstanding, circumferentially spaced lugs or wings. As illustrated, in this first embodiment the casing 10 of the compactor 7 projects above the canister not only into the outlet passage 29 but also, with lateral clearance, into an axially aligned domed cover or cap 35 either integral with or, as shown, releasably mounted on the top wall 36 of the housing 2 and extending into and closing a casing-receiving aperture 37 in that wall. Open by the lateral clearance between it and the casing 10 to filtered compressed air discharged from the canister 8 into the outlet passage 28, the hollow interior 38 of the cover 35 contains the charging and vent check valves 21 and 22 and, through the charging valve, supplies the filtered compressed gas to the pressure chamber 19 for charging or maintaining the charge on the compactor's differential piston 13.

Similar to but preferably somewhat weaker than a conventional tire valve, the charging valve 21 adapts the compactor 7 for charging outside the housing 2 so that the compactor can be charged at the factory and apply a compacting force to the desiccant 6 immediately after the canister-compactor assembly has been assembled, thus not only permitting effective factory testing of the assembly but compacting of the desiccant in the interval between initial assembly and installation of the assembly 1 in the housing 2 of the filter unit 3. Centered on the piston 13, as opposed to the radially offset charging valve 21, the vent valve 22 conveniently is mounted in the top of a hollow, open-bottomed vent post 39 screwed from below or inside into the top of the casing 10 and fitting somewhat loosely in a partial bore 40 in the differential piston 13. With the partial bore 40 open below the head 14 through a radial port 41 to the lower part 20 of the valve compartment 11, the bore and vent post 39 provide a vent passage from that part to the vent valve 22. A shoulder 42 on the vent post 39, abutting against the underside of the top of the casing 10, serves as a stop for limiting upward movement of the piston 12, thus ensuring that the pressure chamber 19 will always be partly open for receiving filtered compressed air through the charging valve 21 and the vent valve 22 conveniently is manually openable outside the housing 2 by a partly exposed pull pin 43.

In this first embodiment, as in L. Frantz U.S. Pat. No. 4,131,442, the closure member 9 for the inlet end 5 of the canister 4 is removably held in closed position inside the canister, suitably by rollpins 44. The preferred closure member 9 of this first embodiment contains a scrubber or other suitable oil separator 45 for separating or trapping oil entrained in the compressed air admitted to the canister, which, if passed to the desiccant 6, would by progressively coating the desiccant particles ultimately render them ineffective for adsorbing moisture from the gas. In the illustrated embodiment, the oil separator 45 contained in the closure member 9 is a pad of stainless steel wool spaced from the adjoining end of the desiccant column 6 by a foraminous end plate 46 mounted on and spaced above the inner end of the closure member for preventing oil removed by the separator from being drawn by capillary action into the desiccant and the closure member also contains in a central bypass passage 47 a normally closed check or relief valve 48 for bypassing the separator in case the latter becomes clogged with oil.

In the second embodiment of FIGS. 4–6, the canister-compactor assembly is modified in several respects to adapt it for installation in a housing 2 of a filter unit 3 in which an oil separator, only an upper part 49 of which is shown, and a drain valve (not shown) for the drain port 32 are both mounted in the lower part 25 of the housing and together support the assembly 1 and actuating compressed gas for normally holding the drain valve closed, is supplied through a central supply pipe 50 extending from the drain valve upwardly through the canister-compactor assembly to a point above the housing where it alternately receives and vents actuating air suitably under control of a solenoid-actuated valve 51 mounted on the top of the housing.

To adapt it for installation in a housing of the above type, the canister-compactor assembly 1 of this second embodiment is provided with a central axial tube 52 in which the supply pipe 50 is slidably received when the assembly is slid, inserted or installed from below into its seat in the central bore 26 of the housing's upper part 24. Screwed at the bottom into a central boss 53 of a foraminous or perforate plate serving in this embodiment as the closure member 9 for the inlet end 5 of the canister 4, the central or center tube 52 extends axially upwardly through the desiccant column 6, floating follower 23, differential piston 13 and top wall of the casing 10 to its terminus at the top of that wall and, in addition to accommodating the supply pipe 50, assists, by sliding engagement therewith, in guiding both the floating follower and the differential piston in their vertical or axial movements relative to the canister 4.

By contrast with that of the first embodiment, the pneumatic compactor 7 of this second embodiment is mounted in the outlet end 8 of the canister 4 by being screwed or threaded from above into that end. Consequently, before the compactor 7 is applied and after the central tube 52 has been screwed into the boss 53 upstanding from the foraminous bottom plate 9, the canister can be loaded through its outlet end 8 with the particulate desiccant 6 and thereafter the floating follower 23. In turn, instead of being the illustrated separate member held in place by an annular abutment or shoulder 54 integral with and instanding from the confronting side of the canister 4, the foraminous bottom plate or closure member 9 can be integral or rigid with the canister and thus dispense with the instanding abutment. For the intended mounting, the compactor's casing 10 is formed with or includes a hub 55 containing the valve compartment 11 and having the bottom cap 12 attached thereto and the hub and cap together mount the differential piston 13 and the charging and vent check valves 21 and 22. With the hub 55 spaced or inset inwardly from the side of the canister 4, the casing has for its threaded connection to the canister an annular rim 56 radially outset from the hub and integrally connected thereto by radial ribs or spokes 57, the circumferential spacing between which and the radial spacing of the hub and rim, provide a way 58 through the casing 10 for passing to the outlet passage 29 in the housing tube filtered compressed gas discharged from the desiccant bed 6 through the floating follower 23. Mounted respectively in the top wall of the casing 10 and the bottom cap 12, the charging check valve 21 and the vent check valve 22 are both in the path of and presented or exposed to the filtered compressed gas flowing from the desiccant bed 6 to the outlet passage 29 for respectively charging the pressure chamber 19 by and venting the valve compartment's lower part 20 into that gas. An abutment or stop 59 upstanding from and preferably centered on the upper side 17 and engageable with the under side of the top of the casing 10, acts as a stop for limiting upward movement or retraction of the piston head 14 so that the pressure chamber 19 is always partly open for receiving actuating gas and the abutment is of smaller cross-sectional area than the plunger 15 for preserving a downward pressure differential on the piston 13 even when the piston is fully retracted.

As previously mentioned, in either embodiment, the canister-compactor assembly 1, by virtue of the mounting of the pneumatic compactor 7 in the outer end of the canister, provides a self-contained unit which, whenever outside or not mounted in a housing 2 of a filter unit 3, can have its compactor charged through the charging check valve 21 with compressed gas for compacting the particulate desiccant 6 and thus inhibiting dust formation by the interabrasion of the particles and can relieve the desiccant of that charge simply by tripping of the check valve. Installable as a unit in the housing of a filter unit which alternates between filtering and idling cycles, the compactor will maintain any previous charge on the compactor 7 and thus the compacting force on the particulate desiccant 6 during the filter unit's idling cycle and during a subsequent filtering cycle of the filter unit will accept an additional charge whenever the pressure in the housing exceeds that in the compactor. By predetermining the relative areas presented or exposed by the upper side 17 of the head 14 and the plunger 15 to suit the pressure to which the compactor will be subjected in service, it therefore is possible to control the compacting force exertable by the compactor upon the desiccant and maintain that force throughout the range of movement of the differential piston and despite any settlement of the desiccant within that range.

From the above detailed description it will be apparent that there has been provided an improved canister-compactor assembly which, by combining a pneumatic compactor and a particulate desiccant canister in a self-contained unit, enables a compacting force to be applied to the particulate desiccant both before and after installation of the assembly in a housing of a compressed gas filter unit and after installation is automatically chargeable as necessary for maintaining a constant force on the desiccant. It should be understood that the described and disclosed embodiment is merely exemplary of the invention and that all modifications are intended to be included that do not depart from the spirit of the invention and the scope of the appended claims.

Having now described my invention I claim:

1. The combination with a compressed gas filter unit having a housing and alternating between filtering and regenerating cycles, of a canister-compactor assembly insertible and removable as a unit in and from said housing, said assembly comprising a canister for containing a particulate desiccant, and a pneumatic compactor mounted in an outlet end of said canister, said compactor including piston means actuated by compressed gas for applying a compacting force to said desiccant and valve means for charging with and discharge of said actuating compressed gas for respectively applying said compacting force to and relieving said desiccant of a previously applied force.

2. An assembly according to claim 1, wherein the valve means when the assembly is outside the housing is actuatable for enabling the compactor to be charged with and dischargeable of said actuating gas and when said assembly is in said housing is automatically actuatable for enabling the compactor to be charged with compressed gas in said housing during a filtering cycle of said filter unit for maintaining a substantially constant compacting force on the desiccant during both filtering and regenerating cycles of the filter unit.

3. An assembly according to claim 2, including means for closing an inlet end of the canister, and follower means floating in the canister between the desiccant and the compactor, and wherein the piston means acts through the follower means for applying the compacting force on the desiccant.

4. An assembly according to claim 3, wherein the valve means includes for charging the compactor with compressed gas a normally closed check valve openable outside the housing for discharging said gas.

5. An assembly according to claim 4, wherein the charging check valve when the assembly is inside the housing is exposed to filtered compressed gas discharged from the desiccant during the filtering cycle of the filter unit for charging the compactor with said gas as needed to maintain the substantially constant compacting force on the desiccant.

6. An assembly according to claim 5, wherein the piston means is a differential piston having a head and a stem of relatively reduced cross-section coaxial with and projecting downwardly from said head and engageable with the follower means, the means for closing the inlet end of the canister and the floating follower means are foraminous, and the compactor includes a casing containing for axial movement relative thereto said head of said differential piston, and said casing is spaced inwardly from a side of the canister for enabling compressed gas to pass through the assembly and therefrom to an outlet port of the housing during a filtering cycle of the filter unit.

7. An assembly according to claim 6, wherein the means for closing the inlet end of the canister is removable for successive insertion through said end of the compactor, the floating follower means and the desiccant, and circumferentially spaced radially outstanding means on the compactor and engaging an instanding annular lip bounding an outlet end of the canister hold the compactor in said outlet end when the assembly is assembled.

8. An assembly according to claim 1, wherein the compactor is removably mounted in the outlet end of the canister by being inserted from above into said end, and the desiccant and floating follower means are loadable into the canister through said outlet end before the compactor is mounted therein.

9. An assembly according to claim 8, wherein the compactor includes a rim radially outstanding from the casing and circumferentially spaced radial rib means connecting said rim and casing, and said rim threadedly engages the canister for enabling the compactor to be screwed into the outlet end thereof.

10. An assembly according to claim 9, wherein the compactor includes a bottom cap removably attached to the casing for closing a bottom of a valve compartment containing the piston head, and the stem of the piston projects downwardly through and the rim and connecting rib means are integral with said cap.

* * * * *